United States Patent
Shi et al.

(10) Patent No.: US 8,787,288 B2
(45) Date of Patent: Jul. 22, 2014

(54) METHOD AND SYSTEM FOR MANAGING CARRIER INFORMATION IN MULTI-CARRIER SYSTEM

(75) Inventors: Lirong Shi, Shenzhen (CN); Meifang He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 19 days.

(21) Appl. No.: 13/501,234

(22) PCT Filed: Feb. 16, 2011

(86) PCT No.: PCT/CN2011/071025
§ 371 (c)(1),
(2), (4) Date: Apr. 10, 2012

(87) PCT Pub. No.: WO2011/103787
PCT Pub. Date: Sep. 1, 2011

(65) Prior Publication Data
US 2012/0307754 A1 Dec. 6, 2012

(30) Foreign Application Priority Data
Feb. 25, 2010 (CN) .......................... 2010 1 0122955

(51) Int. Cl.
*H04W 72/04* (2009.01)
*H04L 5/00* (2006.01)
(52) U.S. Cl.
CPC .......... *H04W 72/0433* (2013.01); *H04L 5/003* (2013.01); *H04L 5/0096* (2013.01)
USPC ....................................................... 370/329
(58) Field of Classification Search
CPC ..... H04W 72/04; H04W 88/08; H04W 76/00; H04W 74/00
USPC ........ 370/329, 327, 318, 281, 335, 235, 441, 370/346; 455/418, 447, 450, 452, 500, 501, 455/509, 522
See application file for complete search history.

(56) References Cited

U.S. PATENT DOCUMENTS

| 7,894,390 B2* | 2/2011 | Nakamata et al. ............ 370/329 |
| 2009/0052376 A1* | 2/2009 | Cave et al. .................... 370/328 |

(Continued)

FOREIGN PATENT DOCUMENTS

| CN | 101127556 A | 2/2008 |
| CN | 101442779 A | 5/2009 |
| CN | 101626600 A | 1/2010 |

OTHER PUBLICATIONS

R1-100278 "Physical Layer Design for 4C-HSPDA", 3GPP TSG RAN WG1 Meeting #59bis, Valencia, Spain, Oct. 18-22, 2009, pp. 1-10.*

(Continued)

*Primary Examiner* — Charles C Jiang
*Assistant Examiner* — Rose Clark
(74) *Attorney, Agent, or Firm* — Ling Wu; Stephen Yang; Ling and Yang Intellectual Property

(57) ABSTRACT

The present invention discloses a method for managing carrier information in a multi-carrier system, and the method includes: when an activated carrier of a User Equipment (UE) is changed, a base station (NodeB) informing a Radio Network Controller (RNC) of the change information of the activated carrier of the UE. The present invention also discloses a multi-carrier system and an RNC. The present invention triggers the RNC to perform resource re-allocation by the NodeB sending the change information of the activated carrier, which guarantees a rational allocation of network resources.

3 Claims, 2 Drawing Sheets

(56) References Cited

U.S. PATENT DOCUMENTS

| | | | |
|---|---|---|---|
| 2010/0177706 A1* | 7/2010 | Wang et al. | 370/329 |
| 2010/0271939 A1* | 10/2010 | Gholmieh et al. | 370/228 |
| 2010/0278130 A1* | 11/2010 | Sambhwani et al. | 370/329 |
| 2011/0158089 A1* | 6/2011 | Sambhwani et al. | 370/230 |
| 2011/0249604 A1* | 10/2011 | Bharadwaj et al. | 370/311 |
| 2012/0129529 A1* | 5/2012 | Deng et al. | 455/436 |
| 2012/0269148 A1* | 10/2012 | Hultell et al. | 370/329 |

OTHER PUBLICATIONS

International Search Report for PCT/CN2011/071025 dated Apr. 29, 2011.

* cited by examiner

METHOD AND SYSTEM FOR MANAGING CARRIER INFORMATION IN MULTI-CARRIER SYSTEM

TECHNICAL FIELD

The present invention relates to the communication field, and particularly, to a method and system for managing carrier information.

BACKGROUND OF THE RELATED ART

The High Speed Downlink Packet Access (HSDPA) is a technique proposed by the 3rd Generation Partnership Project (3GPP) in the Release-5 (Rel-5) and used to improve the network data throughput of the downlink direction (i.e. from network to terminal), and the downlink peak rate can be up to 14.4 Mbps.

In the physical layer, the HSDPA uses a High Speed-Physical Downlink Shared Channel (HS-PDSCH) in the downlink direction to bear the data of a High Speed-Downlink Shared Channel (HS-DSCH). Meanwhile, the HSDPA also uses a High Speed-Shared Control Channel (HS-SCCH) in the downlink direction to send before sending on the corresponding HS-PDSCH, to inform a User Equipment (UE) of some necessary information of the HS-PDSCH sent after the HS-SCCH, and the information includes used spread spectrum code, modulation scheme, transmission block size, Hybrid Automatic Repeat Request (HARQ) process, redundancy version, new data indication and UE identifier, thus the UE specified by the UE identifier can correctly receive the sent data, and the other UEs can not correctly receive the data. In the uplink direction, the HSDPA uses a High Speed Dedicated Physical Control Channel (HS-DPCCH) of the HS-DSCH. The UE feeds back whether a transmission block of the HS-DSCH is correctly received to the network via the HS-DPCCH, wherein an ACK in the fed back information means that the transmission block is correctly received and NACK means that the transmission block is not correctly received, if the transmission block is not correctly received, the data need to be retransmitted. Meanwhile, the UE also feeds back a Channel Quality Indicator (CQI). A CQI table is pre-defined, and each CQI value corresponds to a fixed transmission block size, an HS-PDSCH number and an HS-DSCH subframe of the modulation scheme. The UE should feed back a maximum CQI, which represents that if the HS-DSCH subframe corresponding to the CQI is received by the UE one time slot before a HS-DPCCH subframe carrying the CQI is sent, the error probability of the corresponding transmission block is less than 10%, and this is served as a reference for the radio channel quality of the UE.

In the design of HS-DPCCH, 10 bits of data are used to bear the HARQ-ACK information, furthermore, 20 bits are used to bear the CQI information. Each UE belongs to a specific UE Category according to different capacities, the CQI table corresponding to the UE has 31 items in total, and can be represented by 5-bit data and coded with 20 bits to map to the CQI bit field of the HS-DPCCH. HARQ has two kinds of situations, namely, ACK and NACK, which respectively represent that the data block is correctly received and the received data block has an error, and the HARQ is coded with 10 bits through a specific code book to map to the HARQ-ACK bit field of the HS-DPCCH.

In the following, the 3GPP is strengthened from multiple aspects on the basis of the HSDPA. The Multiple Input Multiple Output (MIMO) antenna technique is a way for improving the radio channel transmission bandwidth therein. The 3GPP adopts the MIMO technique in the Rel-7, which permits that at most two transmission blocks (a main transmission block and an auxiliary transmission block) are simultaneously transmitted to the same UE in a Transmission Time Interval (TTI) of 2 ms. To support the MIMO technique, a sending party needs to modulate the data onto two noncoherent antennas to be simultaneously sent, a receiving party also needs to simultaneously receive the data from the two noncoherent antennas and performs demodulation. In common with the HSDPA, the UE also needs to feed back the HARQ-ACK and CQI after receiving the HS-DSCH data. The difference is that the UE needs to respectively feed back the HARQ-ACK to the two simultaneously received HS-DSCH transmission blocks, and the CQI also corresponds to two space division channels and is recorded as CQI1 and CQI2. In addition, the UE also needs to feed back an antenna array weight namely a precoding weight required by a closed loop MIMO, so as to make the transmission block size maximize. There are four precoding weights: w1, w2, w3 and w4, the (w1, w2) constitute a main precoding vector to perform weighting on the data of the main transmission block; the (w3, w4) constitute an auxiliary precoding vector to perform weighting on the data of the auxiliary transmission block. The main precoding vector is used to transmit the main transmission block and the auxiliary precoding vector is used to transmit the auxiliary transmission block. In the four precoding weights, w1 and w3 are fixed values, w2 and w4 have a fixed symbol relationship, and thus, the UE only needs to feed back the precoding weight w2, which is implemented through a Pre-coding Indicator (PCI). The w2 can take one of the four values, thus the PCI is 2-bit data. In the condition of MIMO, a new CQI table is used, the CQI table corresponding to each specific UE Category has 15 items and is represented by 4-bit data, and the CQI1/CQI2 needs 8 bits in total. Therefore, a combination of PCI/CQI is 10-bit data, and is coded with 20 bits to map to the CQI/PCI bit field (i.e. the original CQI bit field) of the HS-DPCCH. HARQ is required to consider 6 kinds of situations of the combination of ACK/NACK in the condition of single stream and dual stream, and is coded with 10 bits through the specific code book to map to the HARQ-ACK bit field of the HS-DPCCH.

The MIMO technique improves the bandwidth by simultaneously increasing the number of antennas at the sending party and receiving party. If the MIMO technique is not adopted, the bandwidth also can be improved by increasing the number of carriers. To improve the downlink bandwidth further, the 3GPP introduces a Dual Cell-HSDPA (DC-HSDPA) technique in the Rel-8 and uses two adjacent carriers (a main carrier and an auxiliary carrier) to improve the downlink bandwidth. The main carrier and auxiliary carrier respectively configure the HS-PDSCH and HS-SCCH at the same time and perform independent scheduling. For the UE with the ability of receiving the DC-HSDPA, the HSDPA data can be simultaneously received on the main carrier and auxiliary carrier. In common with a single carrier HSDPA, the UE also needs to feed back the HARQ-ACK and CQI after receiving the HS-DSCH data; the difference is that the UE needs to respectively feed back the HARQ-ACK to two HS-DSCH transmission blocks simultaneously received over two carriers, and the CQI also corresponds to the two carriers and is recorded as CQI1 and CQI2. The CQI table corresponding to each CQI has 31 items in total and is represented by 5-bit data, the CQI1 and CQI2 have 10-bit data in total, and are coded with 20 bits to map to the CQI bit field of the HS-DPCCH. HARQ needs to consider 8 kinds of situations of the combination of ACK and NACK in the condition of single carrier and multi-carrier system, and is coded with 10 bits through the specific code book to map to the HARQ-ACK bit field of the HS-DPCCH.

To further improve the downlink bandwidth, the 3GPP combines the DC-HSDPA and MIMO in the Rel-9. In the design of HS-DPCCH, considering the performance and power consumption comprehensively, one HS-DPCCH is still adopted for information feedback. HARQ needs to consider 48 kinds of situations of the combination of ACK and NACK in the conditions of the main carrier and auxiliary carrier and the single stream and dual stream, and is coded with 10 bits through the specific code book to map to the HARQ-ACK bit field of the HS-DPCCH. The PCI needs to perform feedback for the main carrier and auxiliary carrier respectively, is recorded as PCI1 and PCI2 respectively, which are 4-bit data in total. For the CQI, it is defined by using the MIMO CQI table in the Rel-7, each carrier has the CQI1/CQI2 which is 8-bit data, and the main carrier and auxiliary carrier are 16-bit data in total. In other words, the CQI/PCI of the main carrier is 10-bit data and the CQI/PCI of the auxiliary carrier is also 10-bit data. In HS-DPCCH transmission, the CQI/PCI of the main carrier is 10-bit data in total, and is coded with 20 bits to map to the CQI/PCI bit field of one subframe of two successive subframes of the HS-DPCCH; the CQI/PCI of the auxiliary carrier is 10-bit data in total, and is coded with 20 bits to map to the CQI/PCI bit field of another subframe of the two successive subframes of the HS-DPCCH. That is, the CQI/PCI data of the main carrier and auxiliary carrier are transmitted on the HS-DPCCH by the way of time-division multiplexing.

To further improve the user peak rate, more carriers require to be combined and transmitted. For example, if MIMO data are transmitted over a bandwidth of 20 MHz, it requires up to 4 carriers (called as 4C in the following) to be combined, and each carrier can support the HSDPA and MIMO. HARQ information required to be fed back by each carrier is one of the A/N/D/AA/AN/NA/NN and has 7 kinds of situations in total. According to the existing method for transmitting HARQ feedback information, the number of combinations required to be considered in the condition of 4C is 7×7×7×7−1=2400. Because the data field bearing the HARQ feedback information is of 10 bits, 1024 kinds of situations can be fed back at most, and the feedback demand of the HARQ information has been far beyond the bearing capacity of the 10-bit data field. Therefore, a new method for transmitting HARQ information is required and can satisfy the transmission requirement of the HARQ information in the condition of the 4C HSDPA combining with MIMO. Two choices for the HS-DPCCH are discussed in the 3GPP conference, one is to adopt one HS-DPCCH with a spreading factor of 128; the other is to adopt two HS-DPCCHs with a spreading factor still being 256. But no matter which way is adopted, when the multiple carriers such as 3 carriers or 4 carriers are supported, the HS-DPCCH will inevitably change, and the existing technology does not have a method for triggering a Radio Network Controller (RNC) to update resources.

SUMMARY OF THE INVENTION

The present invention provides a method, system and Radio Network Controller (RNC) for managing carrier information in a multi-carrier system, which can trigger the RNC to update carriers.

To achieve the above purpose, the present invention provides a technical scheme as follows.

A method for managing carrier information in a multi-carrier system, wherein, the method comprises:

when an activated carrier of a User Equipment (UE) is changed, a NodeB informing a Radio Network Controller (RNC) of the change information of the activated carrier of the UE.

The method further comprises:

the RNC re-allocating resources for the UE according to the change information of the activated carrier of the UE.

Wherein, if a shifting of a radio resource controller occurs in the UE, the step of the RNC re-allocating resources for the UE comprises:

a Drift Radio Network Controller (DRNC) sending the change information of the activated carrier of the UE to a Serving Radio Network Controller (SRNC); and the SRNC re-allocating resources for the UE according to the change information of the activated carrier of the UE.

Wherein, the NodeB triggers the resource re-allocation by sending radio link parameter update message or multi cell information update message including the change information of the activated carrier of the UE to the RNC.

Wherein, the change information of the activated carrier of the UE comprises at least one kind of the following information:

a high speed dedicated physical control change indication cell with a value of 1SF128, 1SF256 or 2SF256, wherein, the value of 1 represents one high speed dedicated physical control channel, the value of 2 represents two high speed dedicated physical control channels, SF128 represents that the spreading factor is 128, and SF256 represents that the spreading factor is 256;

a carrier type indication cell with a value of 1C, 2C, 3C or 4C, wherein C represents an activated carrier;

whether an auxiliary carrier parameter update cell is carried, if the auxiliary carrier parameter update cell is carried, the number of auxiliary carriers in the auxiliary carrier parameter update cell takes a value of 1, 2 or 3; if the auxiliary carrier parameter update cell is not carried, it represents that the number of the activated auxiliary carriers is 0;

an activated auxiliary carrier number indication cell with a value of 0, 1, 2 or 3;

an activated carrier number indication cell with a value of 1, 2, 3 and 4.

A multi-carrier system, which comprises: a base station (NodeB), a Radio Network Controller (RNC) and a User Equipment (UE), the NodeB is configured to: when an activated carrier of the UE is changed, inform the RNC of the change information of the activated carrier of the UE.

Wherein, the RNC is configured to: re-allocate resources for the UE according to the change information of the activated carrier of the UE.

Wherein, if a shifting of a radio resource controller occurs in the UE, the RNC is configured to: re-allocate resources for the UE according to the change information of the activated carrier of the UE by the following ways:

a Drift Radio Network Controller (DRNC) sending the change information of the activated carrier of the UE to a Serving Radio Network Controller (SRNC); and the SRNC re-allocating resources for the UE according to the change information of the activated carrier of the UE.

Wherein, the NodeB is configured to trigger the resource re-allocation by sending radio link parameter update message or multi cell information update message including the change information of the activated carrier of the UE to the RNC.

Wherein, the change information of the activated carrier of the UE comprises at least one kind of the following information:

a high speed dedicated physical control change indication cell with a value of 1SF128, 1SF256 or 2SF256; wherein the value of 1 represents one high speed dedicated physical control channel, the value of 2 represents two high speed dedicated physical control channels, SF128 represents that the spreading factor is 128, and SF256 represents that the spreading factor is 256;

a carrier type indication cell with a value of 1C, 2C, 3C or 4C, wherein C represents an activated carrier;

whether an auxiliary carrier parameter update cell is carried, if the auxiliary carrier parameter update cell is carried, the number of auxiliary carriers in the auxiliary carrier parameter update cell takes a value of 1, 2 or 3; if the auxiliary carrier parameter update cell is not carried, it represents that the number of the activated auxiliary carriers is 0;

an activated auxiliary carrier number indication cell with a value of 0, 1, 2 or 3;

an activated carrier number indication cell with a value of 1, 2, 3 and 4.

A Radio Network Controller (RNC), which is configured to: when an activated carrier of a User Equipment (UE) is changed, receive the change information of the activated carrier of the UE sent by the NodeB to the RNC.

The RNC is further configured to:

re-allocate resources for the UE according to the change information of the activated carrier of the UE.

Wherein, if a shifting of a radio resource controller occurs in the UE, the RNC is configured to: re-allocate resources for the UE according to the change information of the activated carrier of the UE by the following ways:

a Drift Radio Network Controller (DRNC) sending the change information of the activated carrier of the UE to a Serving Radio Network Controller (SRNC); and the SRNC re-allocating resources for the UE according to the change information of the activated carrier of the UE.

Wherein, the NodeB is configured to: trigger the resource re-allocation by sending radio link parameter message or multi cell information update message including the change information of the activated carrier of the UE to the RNC.

The change information of the activated carrier of the UE comprises at least one kind of the following information:

a high speed dedicated physical control change indication cell with a value of 1SF128, 1SF256 or 2SF256; wherein the value of 1 represents one high speed dedicated physical control channel, the value of 2 represents two high speed dedicated physical control channels, SF128 represents that the spreading factor is 128, and SF256 represents that the spreading factor is 256;

a carrier type indication cell with a value of 1C, 2C, 3C or 4C, wherein C represents an activated carrier;

whether an auxiliary carrier parameter update cell is carried, if the auxiliary carrier parameter update cell is carried, the number of auxiliary carriers in the auxiliary carrier parameter update cell takes a value of 1, 2 or 3; if the auxiliary carrier parameter update cell is not carried, it represents that the number of the activated auxiliary carriers is 0;

an activated auxiliary carrier number indication cell with a value of 0, 1, 2 or 3;

an activated carrier number indication cell with a value of 1, 2, 3 and 4.

The technical scheme provided by the present invention triggers the RNC to perform resource re-allocation by the base station sending the change information of the activated carrier, which guarantees a rational allocation of network resources.

PREFERRED EMBODIMENTS OF THE PRESENT INVENTION

Figure 1:
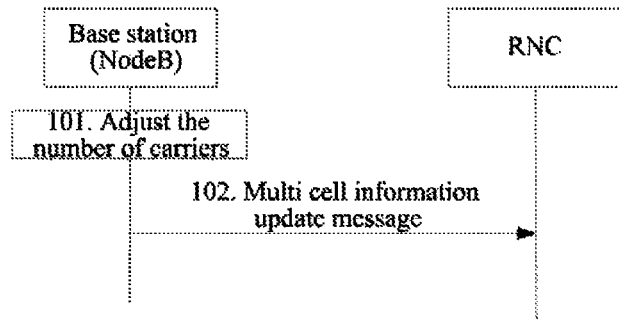
FIG. 1 is a flow chart of method for a NodeB informing an RNC to update carrier information according to the present invention.

The technical scheme provided by the present invention will be further introduced in combination with accompanying drawings below. It should be noted that the examples and the characteristics in the examples according to the present invention can be optionally combined with each other in the condition of no conflict.

The purpose of the present invention is to provide an alteration of the number of carriers activated by a base station (NodeB) in a downlink multi-carrier radio system, that is, a method for updating carrier information when 4 carriers used in the downlink of a single UE are converted to 3 carriers, 2 carriers, and single carrier.

With the method, when the NodeB finds that the service traffic is little when scheduling, the NodeB also can deactivate an auxiliary carrier to save electricity of the UE even though the RNC is configured with multiple carriers. For example: the downlink 4 carriers are converted to 3 carriers by deactivating 1 auxiliary carrier; or are converted to 2 carriers by deactivating 2 auxiliary carriers and; or are converted to a single carrier by deactivating 3 auxiliary carriers. For another example: the downlink 3 carriers are converted to 2 carriers by deactivating 1 auxiliary carrier and; or are converted to single carrier by deactivating 2 auxiliary carriers. Meanwhile, when the NodeB finds that the service traffic is very large, the NodeB can re-activate the auxiliary carrier, so as to provide a higher rate for the UE. For example: the downlink 1 carrier is converted to 2 carriers by re-activating 1 auxiliary carrier; or is converted to 3 carriers by re-activating 2 auxiliary carriers; or is converted to 4 carriers by re-activating 3 auxiliary carriers. For another example: the downlink 2 carriers are converted to 3 carriers by re-activating 1 auxiliary carrier; or are converted to 4 carriers by re-activating 2 auxiliary carriers. The NodeB informs the changes of carrier information such as the change of HS-DPCCH and the number of activated carriers and so on, and the network side re-allocates resources to improve the rational use of resources.

The technical scheme of the present invention is as follows.

The NodeB sends message to inform the RNC of the change information of the activated carrier, wherein the change information of the carrier comprises but is not limited to the changes of HS-DPCCH information and/or the number of activated carriers. The RNC performs resource re-allocation after receiving the multi cell information update message sent by the NodeB.

Example 1

The example uses a NodeB to inform the carrier update information through multi cell information update message, and as shown in FIG. 1, the following steps are comprised.

In step 101, a NodeB adjusts the number of carriers.

Specifically, when the NodeB finds that the service traffic is very little when scheduling, the NodeB also can deactivate an auxiliary carrier in order to save electricity of the UE even though the RNC is configured with multiple carriers. For example: the downlink 4 carriers are and converted to 3 carriers by deactivating 1 auxiliary carrier; or are converted to 2 carriers by deactivating 2 auxiliary carriers; or are converted to single carrier any deactivating 3 auxiliary carriers. For another example: the downlink 3 carriers are converted to 2 carriers by deactivating 1 auxiliary carrier; or are converted to a single carrier by deactivating 2 auxiliary carriers.

When the NodeB finds that the service traffic is large when scheduling, the NodeB can re-activate the auxiliary carrier in order to accelerate the transmission speed of the service. For example: the downlink 1 carrier is converted to 2 carriers by re-activating 1 auxiliary carrier; or is converted to 3 carriers by re-activating 2 auxiliary carriers; or is converted to 4 carriers by re-activating 3 auxiliary carriers. For another example: the downlink 2 carriers are converted to 3 carriers by re-activating 1 auxiliary carrier; or are converted to 4 carriers by re-activating 2 auxiliary carriers.

In step 102, the NodeB sends Multi Cell information Update Message to a RNC.

Wherein the multi cell information update message is newly added message;

the message includes an HS-DPCCH change indication cell, such as HS-DPCCH Code Change Type, the cell takes a value of 1SF128 (representing that an HS-DPCCH with the spreading factor of 128 is allocated), 1SF256 (representing that an HS-DPCCH with the spreading factor of 256 is allocated) or 2SF256 (representing that two HS-DPCCHs with the spreading factor of 256 are allocated).

The message can include a carrier type indication cell such as Multi Cell Change Type, the cell takes a value of 1C (representing that 1 carrier is activated in the downlink), 2C (representing that 2 carriers are activated in the downlink), 3C (representing that 3 carriers are activated in the downlink) or 4C (representing that 4 carrier are activated in the downlink), which is used to represent the current number of carriers;

the message can include an activated auxiliary carrier number indication cell with a value of 0, 1, 2 or 3, or an activated carrier number indication cell with a value of 1, 2, 3 and 4.

Alternatively, the change of the number of carriers included in the massage also can be represented by an auxiliary carrier parameter update cell, if an additional auxiliary carrier parameter update cell is not included, it represents that all auxiliary carriers are not activated, and it is to convert to a single carrier in the downlink; if the number of auxiliary carriers in the additional auxiliary carrier parameter update cell is 1, it represents that 2 carriers are activated in the downlink; if the number of auxiliary carriers in the additional auxiliary carrier parameter update cell is 2, it represents that 3 carriers are activated in the downlink; and if the number of auxiliary carriers in the additional auxiliary carrier parameter update cell is 3, it represents that 4 carriers are activated in the downlink.

Example 2

Figure 2:
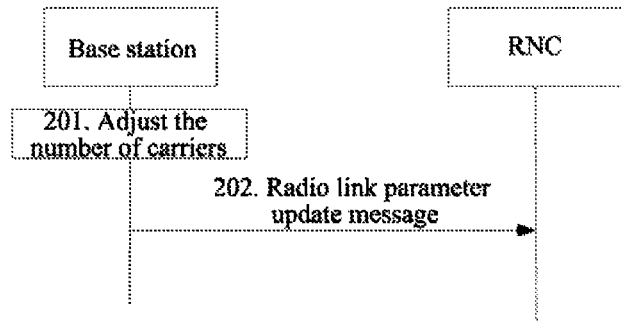
FIG. 2 is another flow chart of method for a NodeB informing an RNC to update carrier information according to the present invention.

In the example, a NodeB informs an RNC of the carrier update information through radio link parameter update message, and as shown in FIG. 2, the following steps are comprised.

In step 201, a NodeB adjusts the number of carriers.

Specifically, when the NodeB finds that the service traffic is very little when scheduling, the NodeB also can deactivate an auxiliary carrier in order to save electricity of the UE even though the RNC is configured with multiple carriers. For example: the downlink 4 carriers are converted to 3 carriers by deactivating 1 auxiliary carrier; or are converted to 2 carriers by deactivating 2 auxiliary carriers; or are converted to single carrier by deactivating 3 auxiliary carriers. For another example: the downlink 3 carriers are converted to 2 carriers by deactivating 1 auxiliary carrier; or are converted to a single carrier by deactivating 2 auxiliary carriers.

When the NodeB finds that the service traffic is large when scheduling, the NodeB can re-activate the auxiliary carrier in order to accelerate the transmission speed of the service. For example: the downlink 1 carrier is converted to 2 carriers by re-activating 1 auxiliary carrier; or is converted to 3 carriers by re-activating 2 auxiliary carriers; or is converted to 4 carriers by re-activating 3 auxiliary carriers. For another example: the downlink 2 carriers are converted to 3 carriers by re-activating 1 auxiliary carrier; or are converted to 4 carriers by re-activating 2 auxiliary carriers.

In step 202, the NodeB sends Radio Link Parameter Update message to a RNC.

The message can include an HS-DPCCH change indication cell, such as HS-DPCCH Code Change Type, the cell takes a value of 1SF128 (representing that an HS-DPCCH with the spreading factor of 128 is allocated), 1SF256 (representing that an HS-DPCCH with the spreading factor of 256 is allocated) or 2SF256 (representing that two HS-DPCCHs with the spreading factor of 256 are allocated).

The message can include a carrier type indication cell such as Multi Cell Change Type, the cell takes a value of 1C (representing that 1 carrier is activated in the downlink), 2C (representing that 2 carriers are activated in the downlink), 3C (representing that 3 carriers are activated in the downlink) or 4C (representing that 4 carrier are activated in the downlink).

the message can include an activated auxiliary carrier number indication cell with a value of 0, 1, 2 or 3, or an activated carrier number indication cell with a value of 1, 2, 3 and 4.

Or it also can be represented by an auxiliary carrier parameter update cell, if an additional auxiliary carrier parameter update cell is not included, it represents that all auxiliary carriers are not activated, and it is to convert to single carrier in the downlink; if the number of auxiliary carriers in the additional auxiliary carrier parameter update cell is 1, it represents that 2 carriers are activated in the downlink; if the number of auxiliary carriers in the additional auxiliary carrier parameter update cell is 2, it represents that 3 carriers are activated in the downlink; and if the number of auxiliary carriers in the additional auxiliary carrier parameter update cell is 3, it represents that 4 carriers are activated in the downlink.

Example 3

Figure 3:
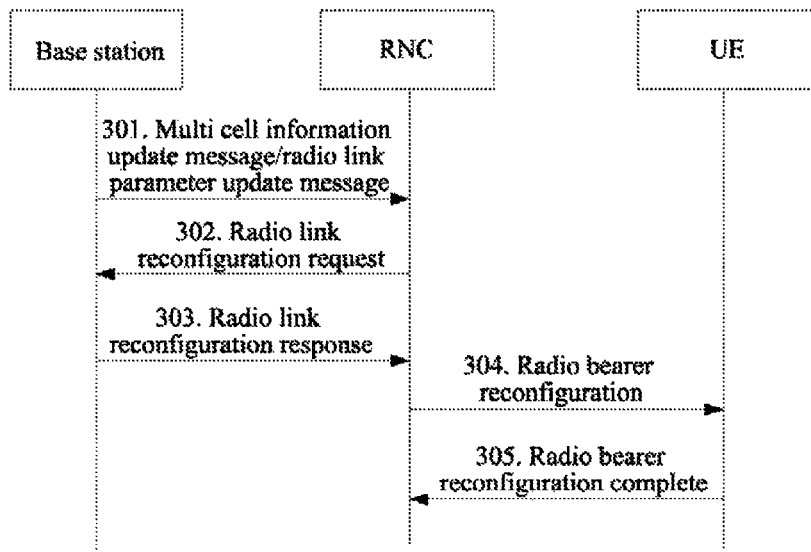
FIG. 3 is a flow chart of method for the RNC updating the carrier information according to the present invention.

In the example, the process of a RNC updating carrier update information is as shown in FIG. 3, and the following steps are comprised.

In step 301, a NodeB sends the carrier update information through multi cell information update message or radio link parameter update message.

In step 302, a RNC sends Radio Link Reconfiguration Request message to the NodeB, and the message includes a cell related to HS-DPCCH.

In step 303, the NodeB returns Radio Link Reconfiguration Response message to the RNC to indicate a success.

In step 304, the RNC sends Radio Bearer Reconfiguration message to a UE, and the message includes the cell related to HS-DPCCH.

In step 305, the UE returns Radio Bearer Reconfiguration Complete message to the RNC.

It should be noted that, in a Wideband Code Division Multiple Access (WCDMA) system and due to the introduction of an Iur interface, the RNC providing services for the UE can be divided in two types, namely, a Serving Radio Network Controller (SRNC) and a Drift Radio Network Controller (DRNC) respectively. In short, in a connection between the UE and Core Network (CN), the RNC which is directly connected with the CN and controls all resources of the UE is called as the SRNC of the UE; and the RNC which is not connected with the CN and provides resources only for the UE is called as the DRNC of the UE. The UE in connection state has one and only one SRNC, and can have no or one or more DRNCs.

When sending the change information of the activated carrier, the NodeB can only send the information to the DRNC, and then the DRNC sends the information to the SRNC. The specific flow refers to the examples 4~5.

Example 4

Figure 4:
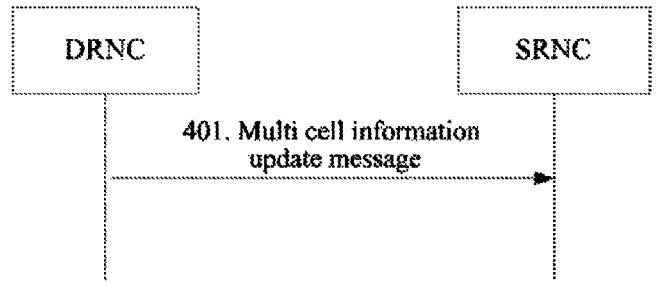
FIG. 4 is a flow chart of method for a DRNC informing a SRNC to update carrier information according to the present invention.

In the example, a DRNC informs a SRNC of the carrier update information through multi cell information update message, and as shown in FIG. 4, the following step is comprised.

In step 401, a DRNC sends Multi Cell Information Update message to a SRNC.

Wherein, the Multi Cell Information Update message is newly added message.

The message can include an HS-DPCCH change indication cell, such as HS-DPCCH Code Change Type, the cell takes a value of 1SF128 (representing that an HS-DPCCH with the spreading factor of 128 is allocated), 1SF256 (representing that an HS-DPCCH with the spreading factor of 256 is allocated) or 2SF256 (representing that two HS-DPCCHs with the spreading factor of 256 are allocated).

The message can include a carrier type indication cell such as Multi Cell Change Type, the cell takes a value of 1C (representing that 1 carrier is activated in the downlink), 2C (representing that 2 carriers are activated in the downlink), 3C (representing that 3 carriers are activated in the downlink) or 4C (representing that 4 carrier are activated in the downlink).

the message can include an activated auxiliary carrier number indication cell with a value of 0, 1, 2 or 3, or an activated carrier number indication cell with a value of 1, 2, 3 and 4.

Alternatively, the change of the number of carriers included in the message also can be represented by an auxiliary carrier parameter update cell, if an additional auxiliary carrier parameter update cell is not included, it represents that all auxiliary carriers are not activated, and it is to convert to single carrier in the downlink; if the number of auxiliary carriers in the additional auxiliary carrier parameter update cell is 1, it represents that 2 carriers are activated in the downlink; if the number of auxiliary carriers in the additional auxiliary carrier parameter update cell is 2, it represents that 3 carriers are activated in the downlink; and if the number of auxiliary carriers in the additional auxiliary carrier parameter update cell is 3, it represents that 4 carriers are activated in the downlink.

Figure 5:
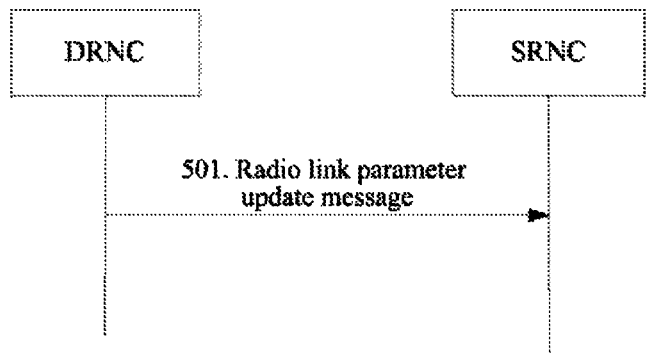
FIG. 5 is another flow chart of method for a DRNC informing a SRNC to update carrier information according to the present invention.

In the example, the DRNC informs the SRNC of the carrier update information through the multi cell information update message, and as shown in FIG. 5, the following step is comprised.

In step 501, the DRNC sends Radio Link Parameter Update Indication message to the SRNC.

The message can include an HS-DPCCH change indication cell, such as HS-DPCCH Code Change Type, the cell takes a value of 1SF128 (representing that an HS-DPCCH with the spreading factor of 128 is allocated), 1SF256 (representing that an HS-DPCCH with the spreading factor of 256 is allocated) or 2SF256 (representing that two HS-DPCCHs with the spreading factor of 256 are allocated).

The message can include a carrier type indication cell such as Multi Cell Change Type, the cell takes a value of 1C (representing that 1 carrier is activated in the downlink), 2C (representing that 2 carriers are activated in the downlink), 3C (representing that 3 carriers are activated in the downlink) or 4C (representing that 4 carrier are activated in the downlink).

the message can include an activated auxiliary carrier number indication cell with a value of 0, 1, 2 or 3, or an activated carrier number indication cell with a value of 1, 2, 3 and 4.

Alternatively, it also can be represented by an auxiliary carrier parameter update cell, if an additional auxiliary carrier parameter update cell is not included, it represents that all auxiliary carriers are not activated, and it is to convert to single carrier in the downlink; if the number of auxiliary carriers in the additional auxiliary carrier parameter update cell is 1, it represents that 2 carriers are activated in the downlink; if the number of auxiliary carriers in the additional auxiliary carrier parameter update cell is 2, it represents that 3 carriers are activated in the downlink; and if the number of auxiliary carriers in the additional auxiliary carrier parameter update cell is 3, it represents that 4 carriers are activated in the downlink.

Example 6

Figure 6:
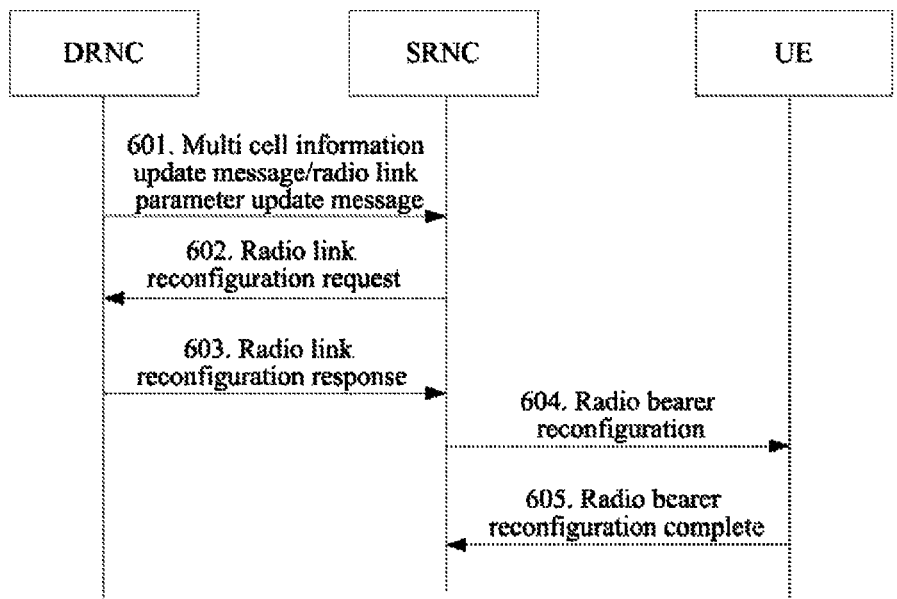
FIG. 6 is a flow chart of method for the SRNC updating the carrier information according to the present invention.

In the example, the specific process of method for a SRNC updating carrier information is as shown in FIG. 6, and the following steps are comprised.

In step 601, a DRNC sends the carrier update information through multi cell information update message or radio link parameter update message.

In step 602, a SRNC sends Radio Link Reconfiguration Request message to the DRNC, and the message includes a cell related to HS-DPCCH.

In step 603, the DRNC returns Radio Link Reconfiguration Response message to the SRNC to indicate a success.

In step 604, the SRNC sends Radio Bearer Reconfiguration message to a UE, and the message includes the cell related to HS-DPCCH.

In step 605, the UE returns Radio Bearer Reconfiguration Complete message to the SRNC.

Correspondingly, the present invention provides a multi-carrier system using the above method, and the multi-carrier system comprises: a NodeB, a Radio Network Controller (RNC) and a User Equipment (UE), when an activated carrier of the UE is changed, the NodeB informs the RNC of the change information of the activated carrier of the UE.

The RNC re-allocates resources for the UE according to the change information of the activated carrier of the UE.

When a shifting of the a radio resource controller occurs in the UE, the RNC re-allocating resources for the UE according to the change information of the activated carrier of the UE comprises: a Drift Radio Network Controller (DRNC) sending the change information of the activated carrier of the UE to a Serving Radio Network Controller (SRNC); and the SRNC re-allocating resources for the UE according to the change information of the activated carrier of the UE.

Wherein, the NodeB triggers the resource re-allocation by sending radio link parameter update message or multi cell information update message including the change information of the activated carrier of the UE.

Wherein, the change information of the activated carrier of the UE comprises at least one kind of the following information:

a high speed dedicated physical control change indication cell with a value of 1SF128, 1SF256 or 2SF256;

a carrier type indication cell with a value of 1C, 2C, 3C or 4C;

a carrier number indication cell with a value of 1, 2, 3 and 4.

Alternatively, it also can be represented by an auxiliary carrier parameter update cell, if an additional auxiliary carrier parameter update cell is not included, it represents that all auxiliary carriers are not activated, it is to convert to a single carrier in the downlink; if the number of auxiliary carriers in the additional auxiliary carrier parameter update cell is 1, it represents that 2 carriers are activated in the downlink; if the number of auxiliary carriers in the additional auxiliary carrier parameter update cell is 2, it represents that 3 carriers are activated in the downlink; and if the number of auxiliary carriers in the additional auxiliary carrier parameter update cell is 3, it represents that 4 carriers are activated in the downlink.

Correspondingly, the present invention also provides a base station (NodeB), and the NodeB is configured to:

when an activated carrier of a User Equipment (UE) is changed, inform a Radio Network Controller (RNC) of the change information of the activated carrier of the UE, to make the RNC re-allocate resources for the UE according to the change information of the activated carrier of the UE.

Wherein, the NodeB is configured to trigger the resource re-allocation by sending radio link parameter message or multi cell information update message including the change information of the activated carrier of the UE to the RNC.

Wherein, the change information of the activated carrier of the UE comprises at least one kind of the following information:

a high speed dedicated physical control change indication cell with a value of 1SF128, 1SF256 or 2SF256;

wherein the value of 1 represents one high speed dedicated physical control channel, the value of 2 represents two high speed dedicated physical control channels, SF128 represents that the spreading factor is 128, and SF256 represents that the spreading factor is 256;

a carrier type indicator cell with a value of 1C, 2C, 3C or 4C, wherein C represents an activated carrier;

whether an auxiliary carrier parameter update cell is carried, if the auxiliary carrier parameter update cell is carried, the number of auxiliary carriers in the auxiliary carrier parameter update cell takes a value of 1, 2 or 3; if the auxiliary carrier parameter update cell is not carried, it represents that the number of activated auxiliary carriers is 0;

an activated auxiliary carrier number indication cell with a value of 0, 1, 2 or 3;

an activated carrier number indication cell with a value of 1, 2, 3 and 4.

Correspondingly, the present invention also provides a Radio Network Controller (RNC), which is configured to:

when an activated carrier of a User Equipment (UE) is changed, receive the change information of the activated carrier of the UE sent by the NodeB to the RNC.

The RNC is further configured to:

re-allocate resources for the UE according to the change information of the activated carrier of the UE.

Wherein, if a shifting of a radio resource controller occurs in the UE, the RNC is configured to re-allocate resources for the UE according to the change information of the activated carrier of the UE according to the following ways:

a Drift Radio Network Controller (DRNC) sending the change information of the activated carrier of the UE to a Serving Radio Network Controller (SRNC); and the SRNC re-allocating resources for the UE according to the change information of the activated carrier of the UE.

Wherein, the NodeB is configured to trigger the resource re-allocation by sending radio link parameter message or multi cell information update message including the change information of the activated carrier of the UE to the RNC.

The change information of the activated carrier of the UE comprises at least one kind of the following information:

a high speed dedicated physical control change indication cell with a value of 1SF128, 1SF256 or 2SF256;

wherein the value of 1 represents one high speed dedicated physical control channel, the value of 2 represents two high speed dedicated physical control channels, SF128 represents that the spreading factor is 128, and SF256 represents that the spreading factor is 256;

a carrier type indication cell with a value of 1C, 2C, 3C or 4C, wherein C represents an activated carrier;

whether an auxiliary carrier parameter update cell is carried, if the auxiliary carrier parameter update cell is carried, the number of auxiliary carriers in the auxiliary carrier parameter update cell takes a value of 1, 2 or 3; if the auxiliary carrier parameter update cell is not carried, it represents that the number of the activated auxiliary carriers is 0;

an activated auxiliary carrier number indication cell with a value of 0, 1, 2 or 3;

an activated carrier number indication cell with a value of 1, 2, 3 and 4.

The ordinary skilled in the art can understand that all or part of steps for implementing the above examples can be completed by a program instructing related hardware, and the program can be stored in a computer readable memory medium. When the program is carried out, one of the steps or a combination of the steps of the method example is included.

In addition, each function unit in each example of the present invention can be implemented in a form of hardware, and also can be implemented in a form of software function module. If implemented in the form of software function module and sold or used as an independent production, the integrated module also can be stored in a computer readable memory medium.

The memory medium mentioned above can be a read-only memory, disk or optical disk and so on.

The above description is only the specific embodiments of the present invention, but the protection scope of the present invention is not limited to this, any person skilled in the art can easily conceive changes and substitutions within the technical scope disclosed by the present invention, and these changes and substitutions shall all fall into the protection scope of the present invention. Therefore, the protection scope of the present invention should be subject to the protection scope described in the claims.

INDUSTRIAL APPLICABILITY

The present invention triggers the RNC to perform resource re-allocation by the NodeB sending the change information of the activated carrier, which guarantees a rational allocation of network resources.

What is claimed is:

1. A method for managing carrier information in a multi-carrier system, the method comprising:
   a base station (NodeB) deciding to activate or deactivate 1, 2 or 3 auxiliary carriers based on the service traffic;
   when a Radio Network Controller (RNC) providing services for a User Equipment (UE) is a Serving Radio Network Controller (SRNC), the NodeB informing the SRNC of the number of the activated carrier(s) of the UE, and then the SRNC re-allocating resources for the UE according to the number of the activated carrier(s) of the UE;
   when the RNC providing services for the UE includes a SRNC and a Drift Radio Network Controller (DRNC), the NodeB sending the number of the activated carrier(s) of the UE to the SRNC via the DRNC, and then the SRNC re-allocating resources for the UE according to the number of the activated carrier(s) of the UE;
   wherein, the NodeB triggers the resource re-allocation by sending a radio link parameter update message or a newly created multi cell information update message, wherein either message includes the number of the activated carrier(s) of the UE;
   wherein, the radio link parameter update message or the multi cell information update message sent by the NodeB comprises at least one kind of the following information:
   a high speed dedicated physical control change indication cell with a value of 1SF128, 1SF256 or 2SF256, wherein, the value of 1 represents one high speed dedicated physical control channel, the value of 2 represents two high speed dedicated physical control channels, SF128 represents that a spreading factor is 128, and SF256 represents that a spreading factor is 256;
   a carrier type indication cell with a value of 1C, 2C, 3C or 4C, wherein C represents an activated carrier;
   when an auxiliary carrier parameter update cell is carried in said radio link parameter update message or multi cell information update message, then the number of auxiliary carriers in the auxiliary carrier parameter update cell takes a value of 1, 2 or 3; when no auxiliary carrier parameter update cell is carried in said radio link parameter update message or multi cell information update message, then it represents that the number of the activated auxiliary carriers is 0;
   an activated auxiliary carrier number indication cell with a value of 0, 1, 2 or 3;
   an activated carrier number indication cell with a value of 1, 2, 3 and 4.

2. A multi-carrier system, the system comprising a base station (NodeB), a Serving Radio Network Controller (SRNC), a Drift Radio Network Controller (DRNC) and a User Equipment (UE), wherein
   the NodeB is configured to: decide to activate or deactivate 1, 2 or 3 auxiliary carriers based on the service traffic; when a RNC providing services for the UE is the SRNC, inform the SRNC of the number of the activated carrier(s) of the UE; when the RNC providing services for the UE includes the SRNC and the DRNC, send the number of the activated carrier(s) of the UE to the DRNC;
   the DRNC is configured to: send the number of the activated carrier(s) of the UE to the SRNC;
   the SRNC is configured to: re-allocate resources for the UE according to the number of the activated carrier(s) of the UE;
   wherein, the NodeB is configured to trigger the resource re-allocation by sending a radio link parameter update message or a newly created multi cell information update message, wherein either message includes the number of the activated carrier(s) of the UE;
   wherein, the radio link parameter update message or the multi cell information update message sent by the NodeB comprises at least one kind of the following information:
   a high speed dedicated physical control change indication cell with a value of 1SF128, 1 SF256 or 2SF256; wherein the value of 1 represents one high speed dedicated physical control channel, the value of 2 represents two high speed dedicated physical control channels, SF128 represents that a spreading factor is 128, and SF256 represents that a spreading factor is 256;
   a carrier type indication cell with a value of 1C, 2C, 3C or 4C, wherein C represents an activated carrier;
   when an auxiliary carrier parameter update cell is carried in said radio link parameter update message or multi cell information update message, then the number of auxiliary carriers in the auxiliary carrier parameter update cell takes a value of 1, 2 or 3; when no auxiliary carrier parameter update cell is carried in said radio link parameter update message or multi cell information update message, then it represents that the number of the activated auxiliary carriers is 0;
   an activated auxiliary carrier number indication cell with a value of 0, 1, 2 or 3;
   an activated carrier number indication cell with a value of 1, 2, 3 and 4.

3. A Serving Radio Network Controller (SRNC), the SRNC being configured to:
   receive from a Drift Radio Network Controller (DRNC) the number of the activated carrier(s) of a User Equipment (UE); wherein the number of the activated carrier(s) of the UE is sent to the DRNC from a base station (NodeB) which decides to activate or deactivate 1, 2 or 3 auxiliary carriers based on the service traffic; and
   re-allocate resources for the UE according to the number of the activated carrier(s) of the UE;
   wherein, the SRNC is further configured to receive the number of the activated carrier(s) of the UE carried in a radio link parameter message or a newly created multi cell information update message, wherein either message includes the number of the activated carrier(s) of the UE;
   wherein, the radio link parameter update message or the multi cell information update message sent by the NodeB comprises at least one kind of the following information:
   a high speed dedicated physical control change indication cell with a value of 1SF128, 1SF256 or 2SF256; wherein the value of 1 represents one high speed dedicated physical control channel, the value of 2 represents two high speed dedicated physical control channels, SF128 represents that a spreading factor is 128, and SF256 represents that a spreading factor is 256;
   a carrier type indication cell with a value of 1C, 2C, 3C or 4C, wherein C represents an activated carrier;
   when an auxiliary carrier parameter update cell is carried in said radio link parameter update message or multi cell information update message, then the number of auxiliary carriers in the auxiliary carrier parameter update cell takes a value of 1, 2 or 3; when no auxiliary carrier parameter update cell is carried in said radio link parameter update message or multi cell information update message, then it represents that the number of the activated auxiliary carriers is 0;

an activated auxiliary carrier number indication cell with a value of 0, 1, 2 or 3;

an activated carrier number indication cell with a value of 1, 2, 3 and 4.

* * * * *